United States Patent
Park (10) Patent No.: US 7,765,233 B2
(45) Date of Patent: Jul. 27, 2010

(54) DATA STRUCTURE RECORDED IN A RECORDING MEDIUM DATA RECORDING METHOD AND DATA RECORDING APPARATUS

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 533 days.

(21) Appl. No.: 11/083,313

(22) Filed: Mar. 18, 2005

(65) Prior Publication Data
US 2005/0210045 A1 Sep. 22, 2005

Related U.S. Application Data

(60) Provisional application No. 60/554,355, filed on Mar. 19, 2004.

(30) Foreign Application Priority Data

Mar. 15, 2005 (KR) ............... 10-2005-0021236

(51) Int. Cl.
G06F 7/00 (2006.01)
G11B 20/18 (2006.01)
(52) U.S. Cl. ............... 707/791; 707/953; 369/47.14; 369/53.17
(58) Field of Classification Search ............... 707/687, 707/790, 791, 796, 953
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi | |
| 4,807,205 A | 2/1989 | Picard | |
| 4,963,866 A | 10/1990 | Duncan | |
| 5,068,842 A | 11/1991 | Naito | |
| 5,111,444 A | 5/1992 | Fukushima et al. | |
| 5,210,734 A | 5/1993 | Sakurai | |
| 5,235,585 A | 8/1993 | Bish et al. | |

(Continued)

FOREIGN PATENT DOCUMENTS

CN 1134017 10/1996

(Continued)

OTHER PUBLICATIONS

International Search Report issued Nov. 3, 2005 in corresponding International Patent Application No. PCT/KR2005/000769.

(Continued)

*Primary Examiner*—John R. Cottingham
*Assistant Examiner*—James E Richardson
(74) *Attorney, Agent, or Firm*—Harness, Dickey & Pierce, P.L.C.

(57) ABSTRACT

The present invention provides a data structure recorded in a recording medium, data recording method and data recording apparatus, in which data are recorded in a high-density recording medium such as a Blu-ray disc. In recording data per cluster within a recording medium, a data structure recorded in the recording system is characterized in that the data includes an address unit in which a plurality of per recording unit address fields included in a corresponding cluster and a control information field indicating per recording unit attribute are recorded and in that each information configuring the control information field is identified by byte unit.

29 Claims, 5 Drawing Sheets

U.S. PATENT DOCUMENTS

| | | | |
|---|---|---|---|
| 5,237,553 A | 8/1993 | Fukushima et al. | |
| 5,247,494 A | 9/1993 | Ohno et al. | |
| 5,319,626 A | 6/1994 | Ozaki et al. | |
| 5,404,357 A | 4/1995 | Ito et al. | |
| 5,442,611 A | 8/1995 | Hosaka | |
| 5,448,728 A | 9/1995 | Takano et al. | |
| 5,475,820 A | 12/1995 | Natrasevschi et al. | |
| 5,481,519 A | 1/1996 | Hosoya | |
| 5,495,466 A | 2/1996 | Dohmeier et al. | |
| 5,526,335 A * | 6/1996 | Tamegai | 369/53.16 |
| 5,528,571 A | 6/1996 | Funahashi et al. | |
| 5,553,045 A | 9/1996 | Obata | |
| 5,577,194 A | 11/1996 | Wells et al. | |
| 5,608,715 A | 3/1997 | Yokogawa et al. | |
| 5,644,539 A * | 7/1997 | Yamagami et al. | 365/200 |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A * | 8/1998 | Ohmori | 710/73 |
| 5,802,028 A | 9/1998 | Igarashi | |
| 5,805,536 A | 9/1998 | Gage et al. | |
| 5,848,038 A | 12/1998 | Igarashi | |
| 5,867,455 A | 2/1999 | Miyamoto et al. | |
| 5,878,020 A | 3/1999 | Takahashi | |
| 5,914,928 A | 6/1999 | Takahashi | |
| 5,930,815 A * | 7/1999 | Estakhri et al. | 711/103 |
| 6,058,085 A | 5/2000 | Obata | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma | |
| 6,341,278 B1 | 1/2002 | Yamamoto et al. | |
| 6,373,800 B1 | 4/2002 | Takahashi | |
| 6,393,513 B2 * | 5/2002 | Estakhri et al. | 711/103 |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko | |
| 6,469,978 B1 | 10/2002 | Ohata et al. | |
| 6,477,126 B1 | 11/2002 | Park et al. | |
| 6,480,446 B1 | 11/2002 | Ko | |
| 6,493,301 B1 | 12/2002 | Park | |
| 6,493,302 B2 * | 12/2002 | Takahashi | 369/53.15 |
| 6,529,458 B1 | 3/2003 | Shin | |
| 6,542,450 B1 | 4/2003 | Park | |
| 6,564,345 B1 | 5/2003 | Kim et al. | |
| 6,581,167 B1 | 6/2003 | Gotoh et al. | |
| 6,594,209 B2 | 7/2003 | Ijtsma et al. | |
| 6,606,285 B1 | 8/2003 | Ijtsma et al. | |
| 6,615,363 B1 | 9/2003 | Fukasawa | |
| 6,631,106 B1 | 10/2003 | Numata et al. | |
| 6,633,724 B1 | 10/2003 | Hasegawa et al. | |
| 6,667,939 B1 | 12/2003 | Miyamoto | |
| 6,671,249 B2 | 12/2003 | Horie | |
| 6,697,306 B2 | 2/2004 | Sako | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama | |
| 6,766,418 B1 | 7/2004 | Alexander et al. | |
| 6,788,631 B1 | 9/2004 | Park et al. | |
| 6,795,389 B1 | 9/2004 | Nishiuchi et al. | |
| RE38,638 E * | 10/2004 | Yonemitsu et al. | 386/95 |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,918,003 B2 | 7/2005 | Sasaki | |
| 6,934,236 B2 | 8/2005 | Lee et al. | |
| 6,999,398 B2 | 2/2006 | Yamamoto et al. | |
| 7,002,882 B2 | 2/2006 | Takahashi | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,257,074 B2 | 8/2007 | Yoshida et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,379,402 B2 | 5/2008 | Ko et al. | |
| 2001/0009537 A1 * | 7/2001 | Park | 369/47.14 |
| 2001/0011267 A1 * | 8/2001 | Kihara et al. | 707/1 |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 * | 7/2003 | Ueda et al. | 369/47.14 |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 * | 1/2004 | Lee | 369/47.14 |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0218488 A1 | 11/2004 | Hwang et al. | |
| 2004/0223427 A1 | 11/2004 | Kim et al. | |
| 2004/0246851 A1 | 12/2004 | Hwang et al. | |
| 2004/0257934 A1 * | 12/2004 | Gotoh et al. | 369/47.14 |
| 2005/0007910 A1 | 1/2005 | Ito et al. | |

| | | | |
|---|---|---|---|
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 464 811 | 1/1992 |
| EP | 0 472 484 | 2/1992 |
| EP | 0 477 503 | 4/1992 |
| EP | 0 556 046 | 8/1993 |
| EP | 0 871 172 | 10/1998 |
| EP | 0 908 882 | 4/1999 |
| EP | 0 974 967 | 1/2000 |
| EP | 0 989 554 | 3/2000 |
| EP | 0 997 904 | 5/2000 |
| EP | 1 026 681 | 8/2000 |
| EP | 1 043 723 | 10/2000 |
| EP | 1 132 914 | 9/2001 |
| EP | 1 143 444 | 10/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 564 740 | 8/2005 |
| EP | 1 612 790 | 1/2006 |
| GB | 2 356 735 | 5/2001 |
| JP | 63-091842 | 4/1988 |
| JP | 01-263955 | 10/1989 |
| JP | 02-023417 | 1/1990 |
| JP | 02-152072 | 6/1990 |
| JP | 4-114371 | 4/1992 |
| JP | 05-274814 | 10/1993 |
| JP | 06-349201 | 12/1994 |
| JP | 08-096522 | 4/1996 |
| JP | 08-147702 | 6/1996 |
| JP | 08-273162 | 10/1996 |
| JP | 09-145634 | 6/1997 |
| JP | 09-231053 | 9/1997 |
| JP | 09-270175 | 10/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11-110888 | 4/1999 |
| JP | 11-203792 | 7/1999 |
| JP | 2000-040308 | 2/2000 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2003-030844 | 1/2003 |
| JP | 2004-280864 | 10/2004 |
| JP | 2004-280865 | 10/2004 |
| JP | 2005-004912 | 1/2005 |
| KR | 10-2004-0094301 | 11/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/063165 | 7/2003 |
| WO | WO 03/079353 | 9/2003 |
| WO | WO 03/105138 | 12/2003 |
| WO | WO 2004/015707 | 2/2004 |
| WO | WO 2004/015708 | 2/2004 |
| WO | WO 2004/019331 | 3/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/075180 | 9/2004 |
| WO | WO 2004/079631 | 9/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |
| WO | WO 2005/024792 | 3/2005 |

OTHER PUBLICATIONS

"JIS Handbook Data Processing for Hardware," Japanese Standards Association Inc., Japan, Apr. 21, 1999, pp. 1064-1070.

International Search Report and Written Opinion for international patent application No. PCT/KR2005/001934 dated Jan. 13, 2006.
International Search Report and Written Opinion for international patent application No. PCT/KR2006/005176 dated Mar. 8, 2007.
International Search Report and Written Opinion for international patent application No. PCT/KR2004/001058 dated Aug. 31, 2004.
Office Action for U.S. Appl. No. 11/797,971, filed Jun. 11, 2008.
Office Action for U.S. Appl. No. 10/841,516, filed Jun. 13, 2008.
Office Action for U.S. Appl. No. 10/840,264, filed Jun. 18, 2008.
Office Action for U.S. Appl. No. 11/147,198, filed Jun. 24, 2008.
Office Action for U.S. Appl. No. 10/781,828, filed Jul. 7, 2008.
Office Action for Russian patent application No. 2006104619/28(005004) dated Jun. 26, 2008.
Office Action for U.S. Appl. No. 10/670,274, filed Jul. 30, 2008.
Seaerch Report for European patent application No. 071100353.8-1247 dated Jun. 5, 2008.
Office Action for U.S. Appl. No. 11/158,358 dated Jul. 25, 2008.
Office Action for counterpart U.S. Appl. No. 10/840,357, filed Oct. 3, 2008.
Office Action for counterpart U.S. Appl. No. 10/841,516, filed Mar. 24, 2009.
Japanese Office Action dated Aug. 18, 2009 issued in corresponding Application No. JP 2006-507838 and English translation thereof.
European Office Action dated Aug. 20, 2009 issued in corresponding Application No. EP 09155333.9.

* cited by examiner

DATA STRUCTURE RECORDED IN A RECORDING MEDIUM DATA RECORDING METHOD AND DATA RECORDING APPARATUS

This application claims the benefit of the Korean Application No. 10-2005-0021236, filed on Mar. 15, 2005, which is hereby incorporated by reference as if fully set forth herein.

This application claims the benefit of the U.S. Provisional Application No. 60/554,355, filed on Mar. 19, 2004, in the name of inventor Yong Cheol PARK, entitled "DATA STRUCTURE OF HIGH DENSITY OPTICAL DISC", which is hereby incorporated by reference as if fully set forth herein.

BACKGROUND OF THE INVENTION

1. Field of the Invention

The present invention relates to a data structure recorded in a recording medium, data recording method and data recording apparatus.

2. Discussion of the Related Art

Generally, an optical disc on which a large capacity of data is recordable is widely used as an optical record medium. Recently, many efforts are made to develop a new high density optical record medium (HD-DVD), on which video data of high definition and audio data of high quality can be recorded and stored, such as a Blu-ray disc (hereinafter abbreviated BD) and the like.

The Blu-ray disc (BD) as a next generation HD-DVD technology is the next generation optical record solution enabling the storage of data to remarkably surpass the previous DVD, and the technology specifications of global standards for the BD are lately established together with other digital equipments.

Moreover, although many efforts are made to develop optical record players adopting the BD specifications, there are many difficulties in developing the complete optical record player since the BD specifications fail to be fully established yet.

Specifically, in order to efficiently reproduce the data recorded in the BD, a file system for managing files of the recorded data is essentially needed, which should be systematized and needs to be provided by a specified system.

However, the current BD specifications fail to be equipped with the unified specifications for the menu information, whereby limitation is greatly put on the development of the full-scale Blu-ray disc (BD) based optical record players.

SUMMARY OF THE INVENTION

Accordingly, the present invention is directed to a data structure recorded in a recording medium, data recording method and data recording apparatus that substantially obviate one or more problems due to limitations and disadvantages of the related art.

An object of the present invention is to provide a data structure recorded in a recording medium, data recording method and data recording apparatus, in which data are recorded in a high-density recording medium such as a Blu-ray disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in recording data per cluster within a recording medium, a data structure recorded in the recording system according to the present invention is characterized in that the data includes an address unit in which a plurality of per recording unit address fields included in a corresponding cluster and a control information field indicating per recording unit attribute are recorded and in that each information configuring the control information field is identified by byte unit.

In another aspect of the present invention, in recording data per cluster within a recording medium, a method of recording data in a recording medium includes the steps of generating a data structure to be finally recorded wherein the data includes an address unit in which a plurality of per recording unit address fields included in a corresponding cluster and a control information field indicating per recording unit attribute are recorded and wherein each information configuring the control information field is identified by byte unit and recording the generated data structure in a designated cluster.

In a further aspect of the present invention, in recording data per cluster within a recording medium, an apparatus for recording data in a recording medium includes a signal processing unit generating a data structure to be finally recorded wherein the data includes an address unit in which a plurality of per recording unit address fields included in a corresponding cluster and a control information field indicating per recording unit attribute are recorded and wherein each information configuring the control information field is identified by byte unit, a pickup unit recording the data structure generated from the signal processing unit in the recording medium, and a microcomputer controlling an operation of the signal processing unit to generate the data structure to be recorded and a recording operation of the pickup unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Besides, although terms used in the present invention are possibly selected from the currently well-known ones, some terms are arbitrarily chosen by the applicant in some cases so that their meanings are explained in detail in the following description. Hence, the present invention should be understood with the meanings of the corresponding terms chosen by the applicant instead of the simple names of the terms.

'Recording medium' used in the present invention means all data-recordable media. For instance, 'recording medium' includes all kinds of media such as an optical disc, a magnetic tape and the like regardless of their recording systems. For convenience of explanation, an optical disc, and more particularly, a 'Blu-ray disc (BD)' is taken as a recording medium to be explain the present invention. The background art of the present invention is applicable to other recording media in the same manner.

Figure 1:
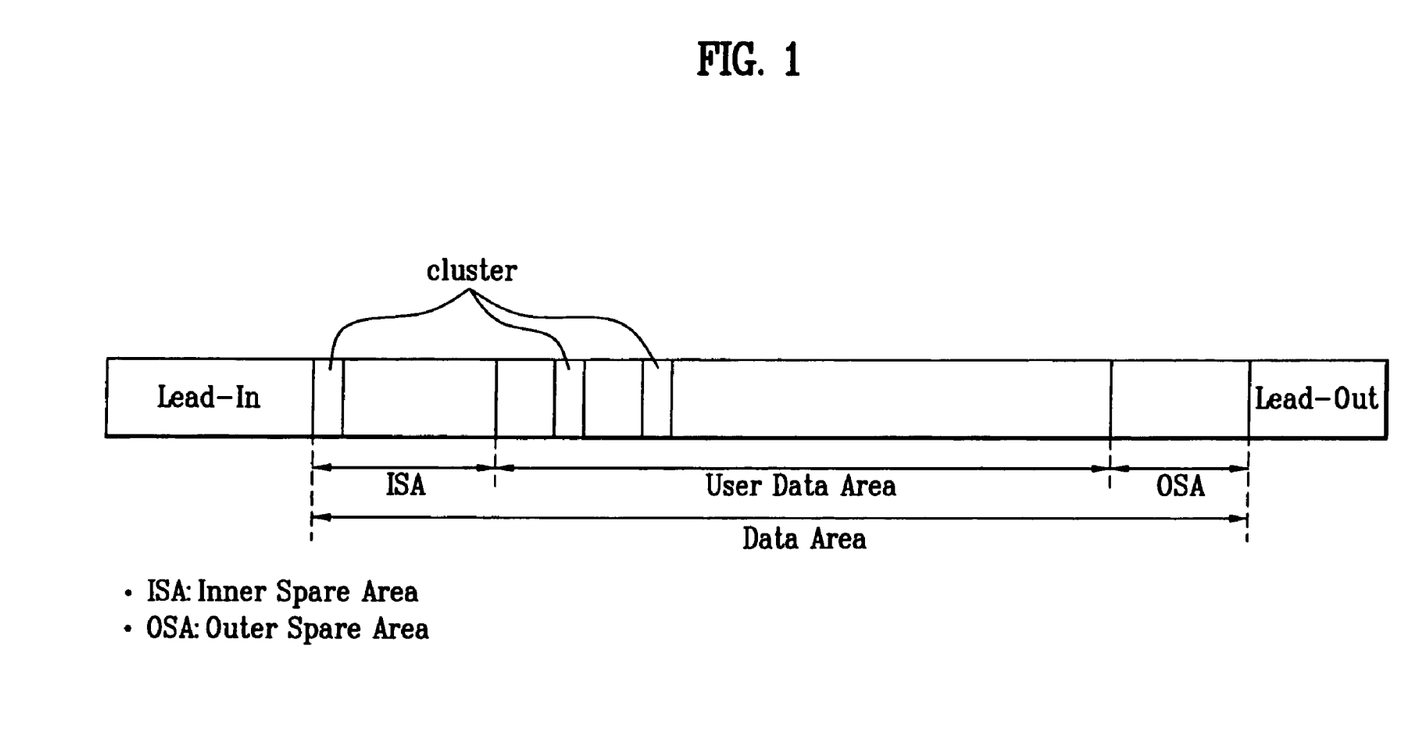
FIG. 1 is a diagram of a recording area structure of an optical disc according to one embodiment of the present invention.

FIG. 1 is a diagram of a recording area structure of an optical disc according to one embodiment of the present invention, in which a recording area structure of a writable BD is shown.

Referring to FIG. 1, an optical disc includes three parts divided into a lead-in area, a data area and a lead-out area. Specifically, the data area includes a user data area for recording real user data therein and a spare area for replacing a defect area within the user data area. The spare area includes an inner spare area (ISA) provided to an inner circumference of the data area and an outer spare area (OSA) provided to an outer circumference of the data area.

In the above-configured optical disc structure shown in FIG. 1, recording is performed on all areas within the data area by cluster unit. Specifically, each cluster is subdivided into a plurality of recording units. For instance, the present invention names the recording unit 'sector'. Total 32 sectors are provided within each cluster. And, one AUN (address unit number) is given to each pair of sectors. Hence, total 16 AUN addresses are recorded within each of the clusters, whereby an address location of each of the sectors can be confirmed from the recorded AUN. The confirmed sector address is called 'PSN (physical sector number)'.

The present invention relates to a method of recording data in the cluster and a data structure configuring the data to be recorded, which is explained in detail as follows.

Figure 2:
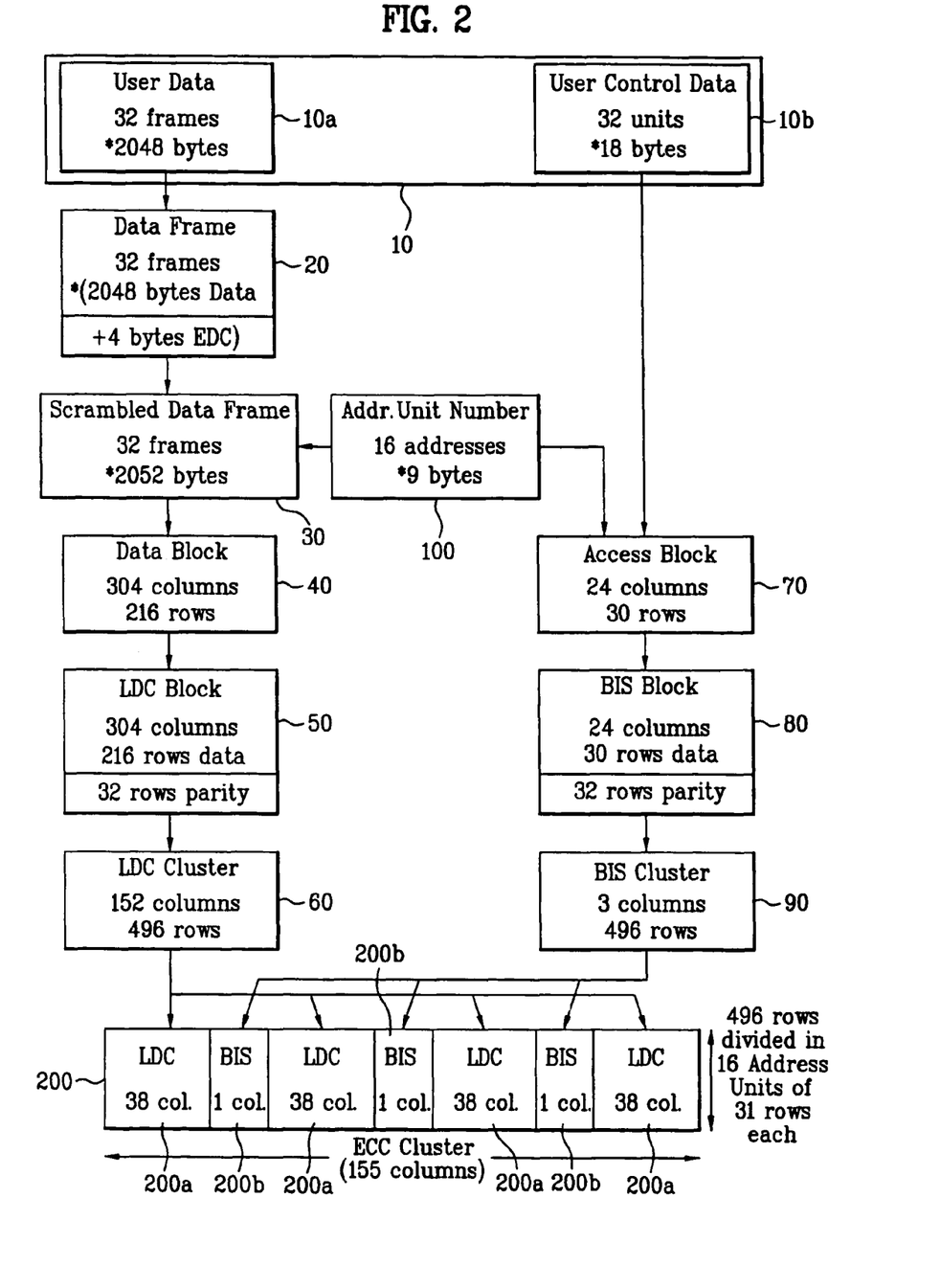
FIG. 2 is a diagram for conceptional understanding of a method of recording data in a recording medium according to the present invention.

FIG. 2 is a diagram for conceptional understanding of a method of recording data in a recording medium according to the present invention.

Referring to FIG. 2, a method of configuring an ECC cluster 200 as a data structure recorded within a cluster is sequentially shown.

First of all, data to be recorded 10 include user data 10a to be recorded and user control data 10b. Specifically, the user data 10a is provided from a control unit or host 12 shown in FIG. 5. And, the user control data 10b include previously decided control information.

4-byte error detection code (EDC) is added to the user data 10a to configure a data frame 20. The data frame 20 utilizes AUN (address unit number) to configure a scrambled data frame constructed with 32 columns.

Each of the columns of the scrambled data frame 30 is rearranged to configure one data block 40 constructed with 304 columns * 216 rows.

To provide error correction capability, RS (Reed-Solomon) code is added to the data block 40 to configure an LDC (long distance code block) 50. The LDC block 50 is interleaved to prevent error concentration occurrence, whereby an LDC cluster 60 constructed with 152 columns * 496 rows is configured.

Figure 5:
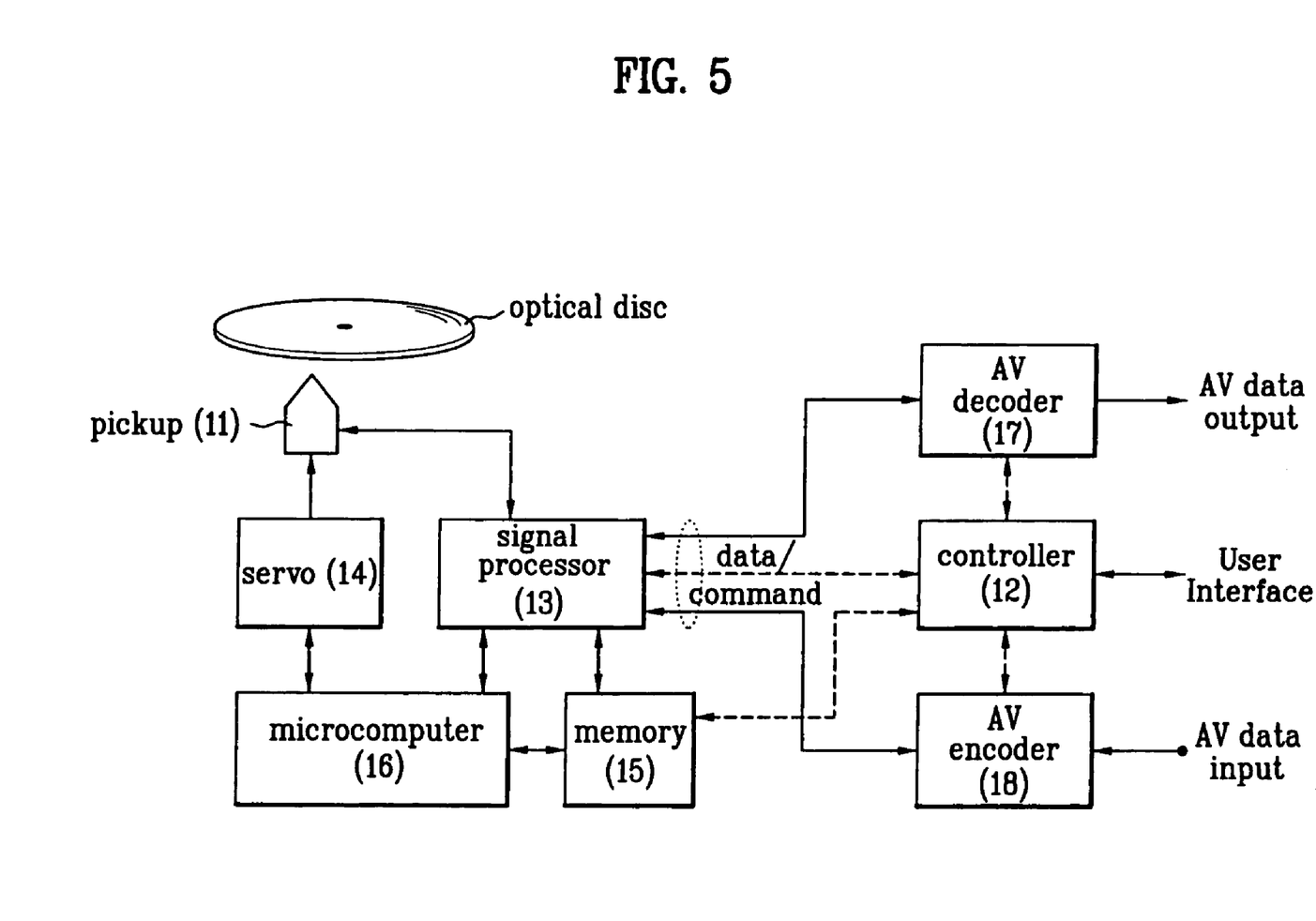
FIG. 5 is a block diagram of an optical record/reproduce apparatus according to the present invention.

Meanwhile, the user control data 10b utilizes an address unit 100 including 16 AUN values and control information to configure an access block 70, whereby an optical record/reproduce apparatus in FIG. 5 is facilitated to access data within the corresponding cluster.

To provide error correction capability, RS (Reed-Solomon) code is added to the access block 70 to configure a BIS (burst indicating subcode) block 80. The BIS block 80 is interleaved to prevent error concentration occurrence, whereby a BIS cluster 90 constructed with 3 columns * 496 rows is configured.

The LDC cluster 60 of 152 columns * 496 rows is divided into four LDCs 200a of 38 columns * 496 rows each. And, the BIS cluster 90 of 3 columns * 496 rows is divided into three BISs 200b of 1 column * 496 rows each.

Finally, the LDCs 200a and BISs 200b are arranged in a sequence of LDC(200a)→BIS(200b)→LDC(200a)→BIS(200b)→LDC(200a)→BIS(200b)→LDC(200a) to configure the ECC cluster 200 of 155 columns*496 rows.

Thereafter, sync information and the like are given to the ECC cluster 200 to be recorded in a specific cluster within the data area.

Figure 3:
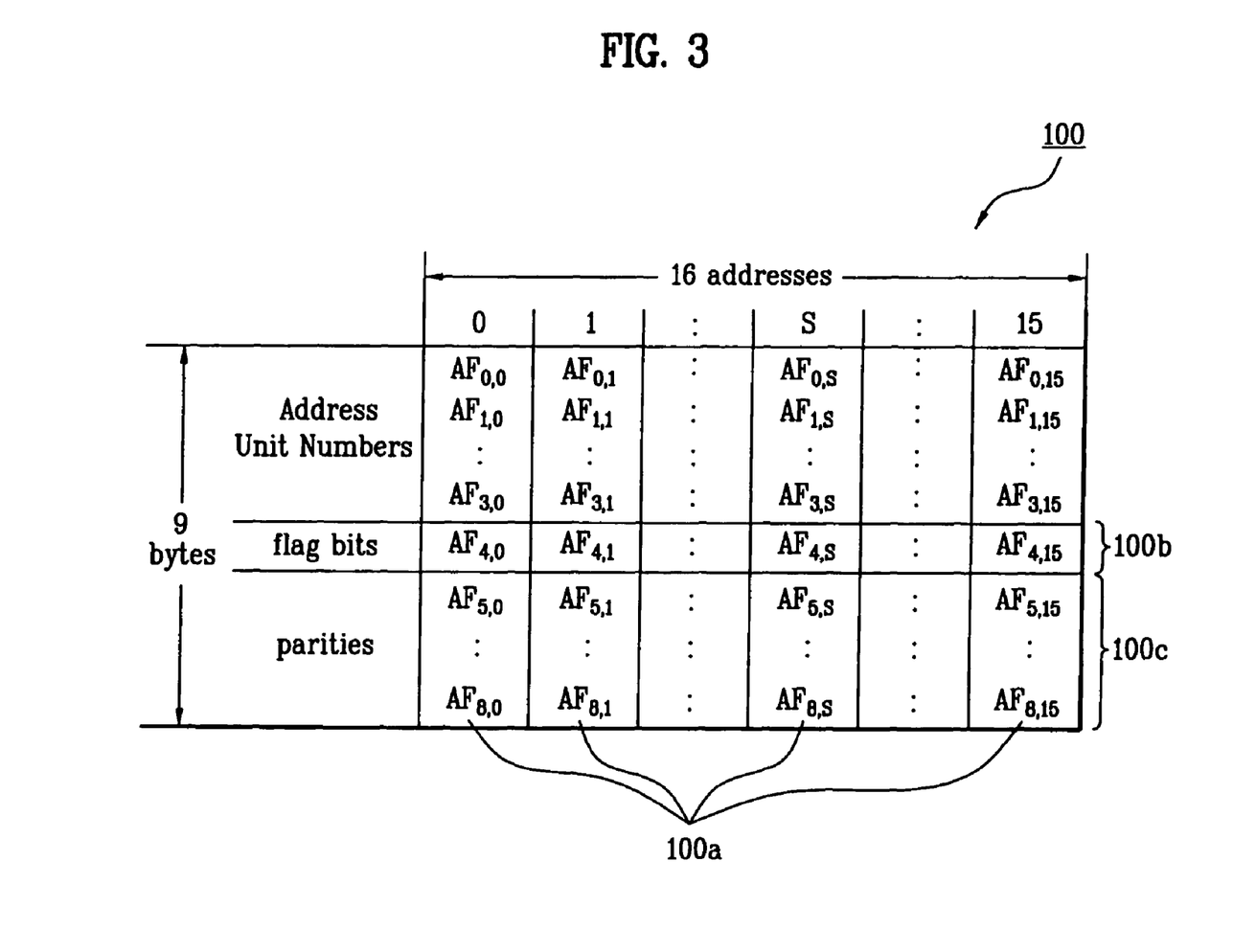
FIG. 3 is a structural diagram of an address unit number (AUN) included in data to be recorded in an optical disc according to the present invention.

FIG. 3 shows a data structure of the address unit 100 including the 16 AUN values and control information.

Referring to FIG. 3, the address unit 100 includes 16 address fields 100a indicating 16 AUN values within a cluster, respectively. Each of the address fields 100a is constructed with total 9 bytes including 4-byte AUN address information, a control information field (flag bits) 100b indicating 1-byte per recording unit attribute, and an error correction field 100c where 4-byte parities for error correction are recorded therein.

For convenience of explanation, each byte configuring the address field is represented by '$AF_{x,y}$', where AF means an address field. For instance, the 4-byte AUN address information configuring an $S^{th}$ address field among the 16 address fields 100a is represented by '$AF_{0,S}$~$AF_{3,S}$'. The 1-byte control information field 100b is represented by '$AF_{4,S}$'. And, the 4-byte error correction field 100c is represented by '$AF_{5,S}$~$AF_{8,S}$'.

Figure 4:
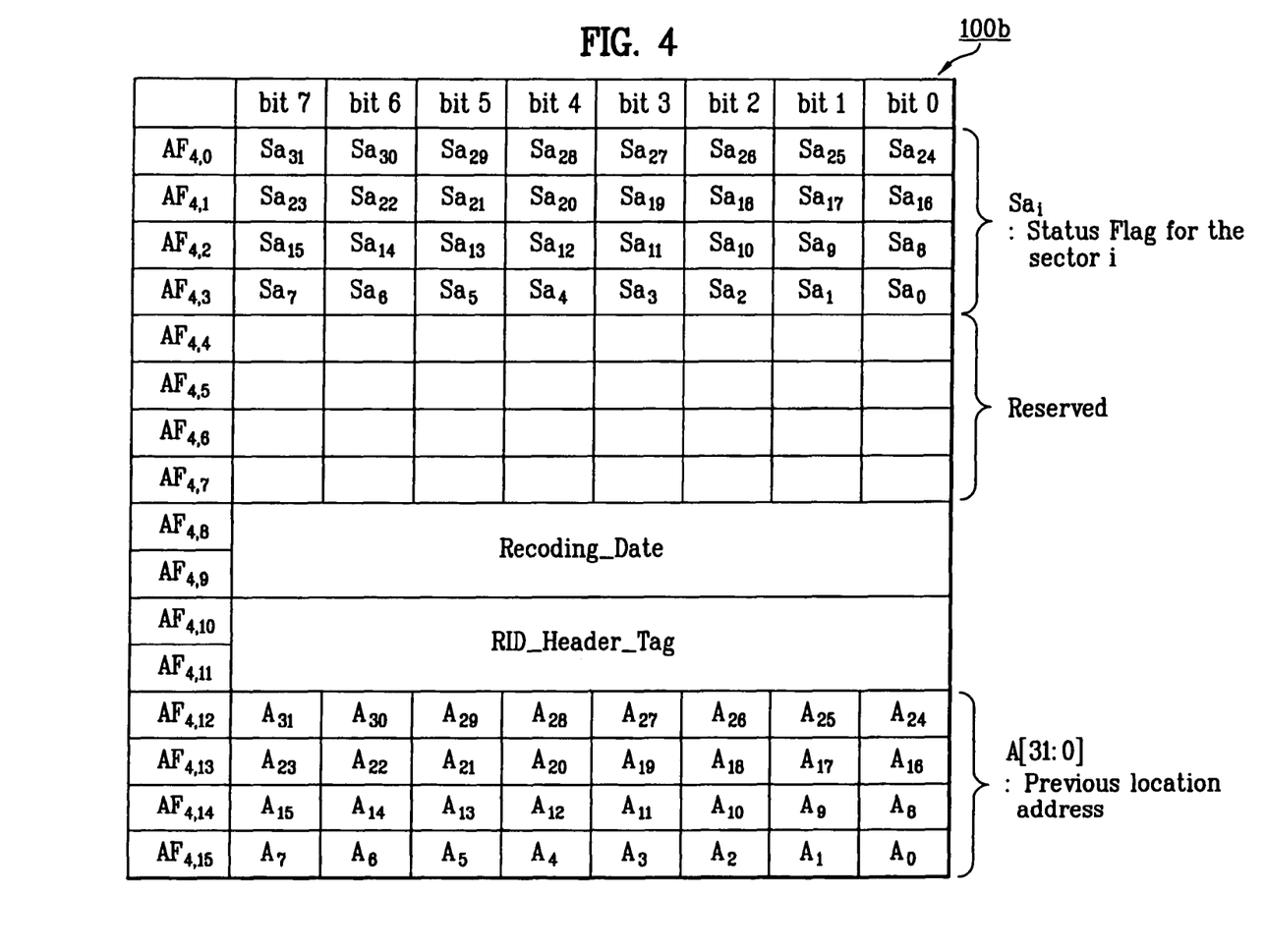
FIG. 4 is a detailed structural diagram of a control information field 100b in the structure of AUM in FIG. 3.

FIG. 4 shows the 16-byte data structure of '$AF_{4,0}$~$AF_{4,15}$' configuring the control information field 100b within each of the address fields, each information configuring the control information field 100b is explained in detail as follows.

First of all, sequential 8 bytes of '$AF_{4,0}$~$AF_{4,7}$' are utilized as status information Sai (status flag for the sector I) indicating 32 per-sector attribute as a recording unit within the cluster. For instance, the present invention utilizes 4 bytes ('$AF_{4,0}$~$AF_{4,3}$') among the 8 bytes to indicate 1 bit as each per-sector attribute information. It is defined that 'Sai=0b' means an errorless sector securing robustness of data. It is defined that 'Sai=1b' means an erroneous sector failing to secure robustness of data. And, the rest 4 bytes ('$AF_{4,4}$~$AF_{4,7}$') are left as a reserved area for later utilization.

Yet, it is apparent that the status information Sai can be utilized to indicate another meaning. By utilizing the entire 8 bytes ('$AF_{4,0}$~$AF_{4,7}$') as status information, it is able to provide subdivided status information by allocating 2 bits to each of the 32 sectors within the cluster. In defining the status information, it is also able to record the status information so that the cluster existing within the user data area differs in definition from the cluster existing within the spare area.

In sequential two bytes of 'AF$_{4,8}$~AF$_{4,9}$', recorded is date information Recording_Date indicating the date when the corresponding cluster is recorded. The date information Recording_Date is written in bit positions designated by a sequence of year-month-date.

In sequential two bytes of 'AF$_{4,10}$~AF$_{4,11}$', recorded is unique identification information of a recorder (RID: recorder identification) that wrote the corresponding cluster. The identification information is configured with specific bit rows uniquely given to each recorder.

Finally, location information of an original cluster prior to substitution is recorded in sequential four bytes of 'AF$_{4,12}$~AF$_{4,15}$' if the corresponding cluster is a substituent cluster within the spare area. Namely, if the corresponding cluster is not the substituent cluster within the spare area, all are set to zero. The optical record/reproduce apparatus in FIG. 5 can accurately confirm the location of the original cluster coping with the corresponding cluster from the location information ('AF$_{4,12}$~AF$_{4,15}$'), thereby coping with data restoration efficiently.

FIG. 5 shows an entire configuration of an optical record/reproduce apparatus according to the present invention.

First of all, 'optical record/reproduce apparatus' in the present invention is used as a generic term for an entire system and equipment recording data in a recording medium such as an optical disc or reproducing data from a recording medium. In case of enabling an operation of recording data in a recording medium like the present invention, the apparatus is called 'recorder'. In case of being used as a PC peripheral device, the apparatus may be called 'drive'.

Referring to FIG. 5, an optical record/reproduce apparatus according to the present invention basically includes a pickup unit 11 reading out data and management file system information including reproduction management file system information recorded within an optical disc, a servo 14 controlling an operation of the pickup unit 11, a signal processing unit 13 restoring a reproduction signal received from the pickup unit 11 into a specific signal value or modulating a signal to be recorded into a signal to be recorded in the optical disc to deliver to the pickup unit 11, a memory 15 temporarily storing the management information and the like therein, and a microcomputer 16 controlling operations of the pickup unit 11, the servo unit 14, the signal processing unit 13 and the memory 15. The configuration including the pickup unit 11, the servo unit 14, the signal processing unit 13, the memory 15 and the microcomputer 16 can be called the 'drive'.

A decoder 17 provides a decoded signal, which is generated from decoding a signal read from the optical disc according to a predefined format (e.g., MPEG decoder), to a final user. And, to perform a function of recording a signal in an optical disc, an encoder 18 converts an input signal to a specifically formatted signal, e.g., an MPEG2 transport stream according to a control of the control unit 12 and then provides the converted signal to the signal processing unit 13.

The control unit 12 is in charge of an overall control of the optical record/reproduce apparatus. The control unit 12 receives a user command though interactions with a user and utilizes it in controlling the operations of the respective elements.

A data recording method using the above-configured optical record/reproduce apparatus according to the present invention is explained in detail as follows.

First of all, the control unit 12 delivers a location of a specific cluster to be recorded and the user data (10a in FIG. 2) to be recorded in the corresponding cluster to the microcomputer 16 via the signal processing unit 13.

According to the control of the microcomputer 16, the signal processing unit 13 configures the final ECC cluster, as described in FIG. 2, including the user data 10a delivered from the control unit 12. The pickup unit 11 then records the configured ECC cluster in the previously decided cluster within the optical disc according to the control of the microcomputer 16.

Specifically, in configuring the data structure to be recorded in the specific cluster within the optical disc, the signal processing unit 13 generates the data structure to be recorded. In this case, the data structure includes the address unit in which a plurality of per-recording unit address fields included in the corresponding cluster and the control information field indicating the per recording unit attribute are recorded. And, each information configuring the control information field is identified by byte unit and is scrambled within the corresponding cluster to generate the data structure to be recorded.

Accordingly, the present invention enables implementations of the data structure and the data recording method and apparatus using the same, thereby enabling reliable data recording.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer-readable storage medium, comprising:
a data area storing data by data-recording block unit, the data area including a user data area and a spare area, wherein the data which are stored in at least one of the user data area and the spare area, includes an address unit, the address unit including a plurality of address fields and control information, each address field indicating an address of a corresponding sub-data-recording block unit within the data-recording block unit, the control information including status information and second address information, the status information indicating the status of the stored data contained in each individual sub-data-recording block unit included in the data-recording block unit, the second address information indicating an address of a previous original data recording block unit,
wherein if the data-recording block unit is recorded by substitution of the previous original data-recording block unit, the second address information includes a first physical sector number of the previous original data-recording block unit, and wherein if the second address information is set to zero, the data-recording block unit is not a substitution for the previous original data-recording block unit.

2. The storage medium of claim 1, wherein the status information is provided by allocating 2 bits to per sub-data-recording block unit.

3. The storage medium of claim 2, wherein at least four sequential bytes within the control information configure the status information for all sub-data-recording block units within the corresponding data-recording block unit.

4. The storage medium of claim 1, wherein at least four sequential bytes within the control information configure the second address information.

5. The storage medium of claim 1, wherein the control information includes recording data information indicating when the corresponding data-recording block unit is recorded.

6. The storage medium of claim 5, wherein at least two sequential bytes within the control information configure the recording data information.

7. The storage medium of claim 1, wherein the control information includes unique identification information of a recorder having recorded the corresponding data-recording block unit.

8. The storage medium of claim 7, wherein at least two sequential bytes within the control information configure the unique identification information of the recorder.

9. The storage medium of claim 1, wherein the address unit further includes parity information for error correction.

10. A method of recording data in a user data area and a spare area of a recording medium using a computer having a microprocessor, comprising the steps of:
generating a data structure including data to be recorded by data-recording block unit, wherein the data which are stored in at least one of the user data area and the spare area, includes an address unit, the address unit including a plurality of address fields and control information, each address field indicating an address of a corresponding sub-data-recording block unit within the data-recording block unit, the control information including status information and second address information, the status information indicating the status of the stored data contained in each individual sub-data-recording block unit included in the data-recording block unit, the second address information indicating an address of a previous original data-recording block unit, and
recording the generated data structure in the recording medium, wherein if the data-recording block unit is recorded by substitution of the previous original data-recording block unit, the second address information includes a first physical sector number of the previous original data-recording block unit, and wherein if the second address information is set to zero, the data-recording block unit is not a substitution for the previous original data-recording block unit.

11. The method of claim 10, wherein the status information is provided by allocating 2 bits to per sub-data-recording block unit.

12. The method of claim 11, wherein at least four sequential bytes within the control information configure the status information for all sub-data-recording block units within the corresponding data-recording block unit.

13. The method of claim 10, wherein at least four sequential bytes within the control information configure the second address information.

14. The method of claim 10, wherein the control information includes recording data information indicating when the corresponding data-recording block unit is recorded.

15. The method of claim 14, wherein at least two sequential bytes within the control information configure the recording data information.

16. The method of claim 10, wherein the control information includes unique identification information of a recorder having recorded the corresponding data-recording block unit.

17. The method of claim 16, wherein at least two sequential bytes within the control information configure the unique identification information of the recorder.

18. The method of claim 10, wherein the address unit further includes parity information for error correction.

19. An apparatus for recording data in a user data area and a spare area of a recording medium, comprising:
a signal processing unit configured to generate a data structure including data to be recorded by data-recording block unit, wherein the data which are stored in at least one of the user data area and the spare area, includes an address unit, the address unit including a plurality of address fields and control information, each address field indicating an address of a corresponding sub-data-recording block unit within the data-recording block unit, the control information including status information and second address information, the status information indicating the status of the stored data contained in each individual sub-data-recording block unit included in the data-recording block unit, the second address information indicating an address of a previous original data-recording block unit, wherein if the data-recording block unit is recorded as a substitution for the previous original data-recording block unit, the second address information includes a first physical sector number of the previous original data-recording block unit and wherein if the second address information is set to zero, the data-recording block unit is not a substitute for the previous original data-recording block unit,
a pickup unit configured to record the data structure generated from the signal processing unit in the recording medium; and
a microcomputer configured to control the signal processing unit to generate the data structure to be recorded.

20. The apparatus of claim 19, wherein the status information is provided by allocating 2 bits to per sub-data-recording block unit.

21. The apparatus of claim 19, wherein at least four sequential bytes within the control information configure the status information for all sub-data-recording block units within the corresponding data-recording block unit.

22. The apparatus of claim 19, wherein at least four sequential bytes within the control information configure the second address information.

23. The apparatus of claim 19, wherein the control information includes recording data information indicating when the corresponding data-recording block unit is recorded.

24. The apparatus of claim 23, wherein at least two sequential bytes within the control information configure the recording data information.

25. The apparatus of claim 19, wherein the control information includes unique identification information of a recorder having recorded the corresponding data-recording block unit.

26. The apparatus of claim 25, wherein at least two sequential bytes within the control information configure the unique identification information of the recorder.

27. the apparatus of claim 19, wherein the address unit further includes parity information for error correction.

28. A method of reproducing a data structure including data recorded in a data-recording block unit of a recording medium using a computer having a microprocessor, comprising the step of:
reproducing the data from the recording medium, the data being reproduced from at least one of a user data area and a spare area, and including an address unit including a plurality of address fields and control information, each address field indicating an address of a corresponding sub-data-recording block unit within the data-recording block unit, the control information including status information and second address information, the status information indicating the status of the stored data contained in each individual sub-data-recording block unit included in the data-recording block unit, the second address information indicating an address of a previous original data-recording block unit, wherein if the second address information is set to zero, the data-recording block unit is not a substitution for the previous original data-recording block unit.

29. An apparatus of reproducing a data structure including data recorded in a data-recording block unit of a recording medium, comprising:

a pickup unit configured to read data structure information recorded in the data structure from the recording medium; and a microcomputer configured to control the pickup unit to reproduce the data from the recording medium, the data being reproduced from at least one of a user data area and a spare area and including an address unit, the address unit including a plurality of address fields and control information, each address field indicating an address of a corresponding sub-data-recording block unit within the data-recording block unit, the control information including status information and second address information, the status information indicating the status of the stored data contained in each individual sub-data-recording block unit included in the data-recording block unit, the second address information indicating an address of a previous original data-recording block unit, wherein if the second address information is set to zero, the data-recording block unit is not a substitution for the previous original data-recording block unit.

* * * * *